United States Patent
Ono et al.

(10) Patent No.: US 7,754,344 B2
(45) Date of Patent: Jul. 13, 2010

(54) FERRITIC STAINLESS STEEL WELDED PIPE SUPERIOR IN EXPANDABILITY

(75) Inventors: Naoto Ono, Tokyo (JP); Toshio Tanoue, Tokyo (JP); Fumio Fudanoki, Tokyo (JP); Tadashi Komori, Tokyo (JP); Shuji Yamamoto, Kitakyushu (JP)

(73) Assignee: Nippon Steel & Sumikin Stainless Steel Corporation, Tokyo (JP)

(*) Notice: Subject to any disclaimer, the term of this patent is extended or adjusted under 35 U.S.C. 154(b) by 346 days.

(21) Appl. No.: 10/587,643

(22) PCT Filed: Dec. 19, 2005

(86) PCT No.: PCT/JP2005/023691
§ 371 (c)(1),
(2), (4) Date: Jul. 28, 2006

(87) PCT Pub. No.: WO2006/068258
PCT Pub. Date: Jun. 29, 2006

(65) Prior Publication Data
US 2007/0170226 A1    Jul. 26, 2007

(30) Foreign Application Priority Data
Dec. 22, 2004  (JP)  ............................. 2004-370616
Jan. 12, 2005  (JP)  ............................. 2005-005023

(51) Int. Cl.
B32B 5/14     (2006.01)
B32B 15/18    (2006.01)
F16L 9/00     (2006.01)
B23K 28/00    (2006.01)

(52) U.S. Cl. ................. 428/685; 428/217; 138/171; 228/156

(58) Field of Classification Search ............... None
See application file for complete search history.

(56) References Cited

U.S. PATENT DOCUMENTS

| | | | |
|---|---|---|---|
| 6,645,318 B2* | 11/2003 | Takahashi et al. | 148/325 |
| 6,851,455 B2* | 2/2005 | Otsuka et al. | 138/171 |
| 2003/0116238 A1* | 6/2003 | Fujita et al. | 148/593 |
| 2003/0183292 A1* | 10/2003 | Otsuka et al. | 138/109 |

FOREIGN PATENT DOCUMENTS

| | | |
|---|---|---|
| CN | 100513610 | 7/2009 |
| JP | 05-277769 | 10/1993 |

(Continued)

*Primary Examiner*—Jennifer C McNeil
*Assistant Examiner*—Jason L Savage
(74) *Attorney, Agent, or Firm*—Kenyon & Kenyon LLP

(57) ABSTRACT

A ferritic stainless steel welded pipe is ferritic stainless steel welded pipe contains, by wt %, C: 0.001 to 0.015%, N: 0.001 to 0.020%, Cr: 11 to 25%, Mo: 0.01 to 2.0%, one or both of Ti and Nb in 0.05 to 0.5%, and B: 0.0003 to 0.0030%, having an elongation of the welded pipe material in the direction becoming the circumferential direction of 30% or more, and having an average Lankford value of 1.5 or more, which is formed, welded, and sized by 0.5 to 2.0% in terms of circumferential length, then annealed at 700 to 850° C., and has the hardness difference between the weld zone and the matrix is 10 to 40 in range and a ratio between the bead thickness of the weld zone and the thickness of the matrix is 1.05 to 1.3.

4 Claims, 5 Drawing Sheets

FOREIGN PATENT DOCUMENTS

| | | |
|---|---|---|
| JP | 06-041689 | 2/1994 |
| JP | 07-265941 | 10/1995 |
| JP | 7-266072 | 10/1995 |
| JP | 07-266072 | 10/1995 |
| JP | 07-286239 | 10/1995 |
| JP | 08-257777 | 10/1996 |
| JP | A-2000-326079 | 11/2000 |
| JP | A-2002-155345 | 5/2002 |
| JP | 2002-242779 | 8/2002 |
| JP | A-2004-243410 | 9/2004 |
| JP | A-2005-271040 | 10/2005 |

* cited by examiner

POSITION OF OCCURRENCE OF CRACKS AND CONSTRICTION IN ECCENTRIC EXPANDED PART

Fig.4
(1) WELD ZONE STRENGTH<MATRIX STRENGTH
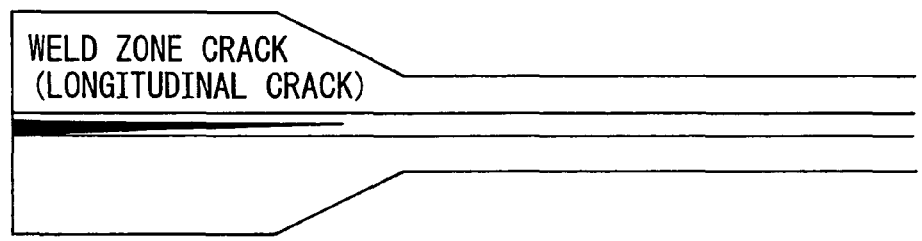
(2) WELD ZONE STRENGTH>MATRIX STRENGTH
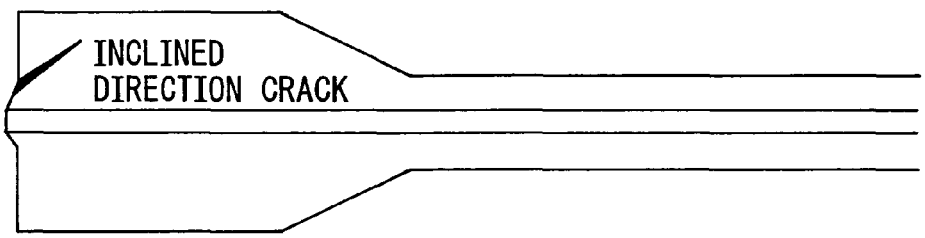
Fig.5
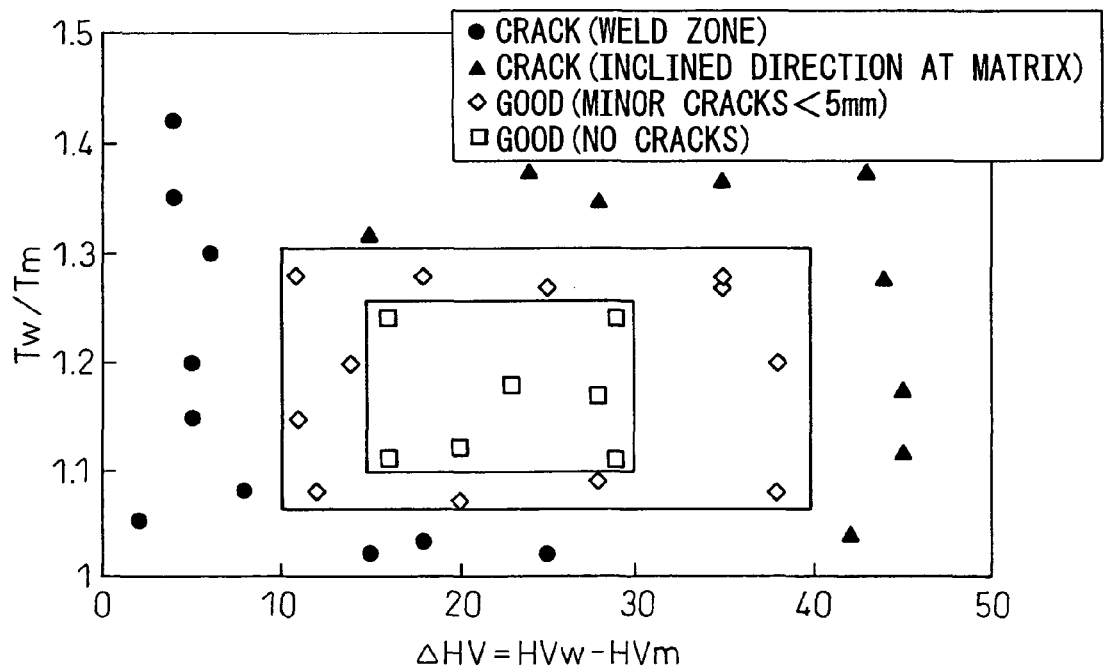

FERRITIC STAINLESS STEEL WELDED PIPE SUPERIOR IN EXPANDABILITY

TECHNICAL FIELD

The present invention relates to a ferritic stainless steel welded pipe used for automobile exhaust system parts, fuel inlet pipes of automobile fuel system parts, and other applications where working by expansion is extensive and high temperature oxidation, corrosion due to adhesion of snow melting agents etc., and high temperature salt damage corrosion are severe and prevents expansion cracks occurring at the matrix or the weld zone or the matrix near the weld zone due to expansion work including eccentric working to two or more times the original pipe diameter.

BACKGROUND ART

Ferritic stainless steel has a small coefficient of heat expansion, so has been used for automobile exhaust system parts subjected to repeated heating and cooling. Further, recently, due to its low susceptibility to stress corrosion cracks in case of deposition of snow melting agents in cold regions, it has started to be used for fuel inlet pipes of automobile fuel system parts. Most of these parts are thin welded pipes which are bent, bulged, expanded, etc. In particular, in fuel inlet pipes, Japanese Patent Publication (A) No. 2002-242779 discloses to secure a rust-prevention performance by integral and eccentric expansion of pipes. Sometimes the pipes are worked to two times or more the diameters of the original pipes. The pipes used therefore are required to have superior expandability.

In view of these requirements, as ferritic stainless steel pipe superior in workability, Japanese Patent Publication (A) No. 6-41689 defines Lankford values (r values) in the rolling direction of the material or the direction perpendicular to rolling, Japanese Patent Publication (A) No. 5-277769 discloses a method of production comprising preheating before laser welding or inside surface bead overlay, and then rolling of the weld bead to eliminate the overlay, while Japanese Patent Publication (A) No. 7-265941, Japanese Patent Publication (A) No. 7-266072, Japanese Patent Publication (A) No. 7-286239, Japanese Patent Publication (A) No. 8-257777, and Japanese Patent Publication (A) No. 2000-326079 disclose combining roll-less pipemaking and laser welding during which defining the heat input of the laser welding machine and pipemaking speed, the relationship between the bending roll radius and plate thickness in the roll-less pipemaking method, and the sizing conditions to adjust the hardness difference between the matrix and the weld zone or adjust the amounts of C, N, and O and inclusions in the laser weld zone and thereby improve the bulgeability, expandability, and bendability of the weld zone, but with just adjusting the grade of the material, the shape of the weld bead, or the hardness of the weld bead, it is difficult to withstand extremely severe expansion to two times or more the diameter of the original pipe and accompanied with eccentric expansion.

On the other hand, in terms of the material as well, the usage environment has become harsher and improvement of the lifetime and other facets of durability has been demanded, so improvement in the corrosion resistance, high temperature salt damage resistance, oxidation resistance, high temperature strength, and heat fatigue has been sought. Cr, Mo, Nb, and other alloying elements are being included in increasing amounts as a general trend. This is a direction not preferable from the viewpoint of the workability, so a welded pipe material achieving both usage performance and workability is being sought.

DISCLOSURE OF THE INVENTION

The present invention, in view of this situation, has as its object the provision of ferritic stainless steel welded pipe superior in expandability which prevents the expansion cracks occurring at a matrix in expansion including eccentric working to two or more times the diameter of the original pipe and cracks in the weld zone or the matrix near the weld zone.

To realize the above object, the present inventors studied the deformation behavior of welded pipe in that expansion and the relationship between expandability and the matrix characteristics and obtained the finding that in order to improve the expandability by a multi-step process and obtain expandability to two or more times the diameter of the original pipe including an eccentric expansion step, the characteristics of the original plate, the characteristics of the matrix after pipemaking, and the balance of strength of the matrix and the weld zone due to the hardness and the weld bead thickness are extremely important. The gist of the invention is as follows:

(1) Ferritic stainless steel welded pipe superior in expandability, said ferritic stainless steel welded pipe characterized in that after forming, welding, and sizing, a matrix of the welded pipe has an elongation in the circumferential direction of 15% or more.

(2) Ferritic stainless steel welded pipe superior in expandability including one or both of Ti and Nb by wt % in an amount of 0.05 to 0.5%, said ferritic stainless steel welded pipe characterized in that a hardness difference $\Delta HV$ ($=HV_W-HV_M$) between the Vicker's hardness $HV_W$ of the weld zone and the Vicker's hardness $HV_M$ of the matrix is 10 to 40 in range and in that a ratio RT ($=T_W/T_M$) between a bead thickness $T_W$ of the weld zone and a thickness $T_M$ of the matrix is 1.05 to 1.3.

(3) Ferritic stainless steel welded pipe superior in expandability as set forth in (1) or (2), characterized by using an original plate including, by wt %, C: 0.001 to 0.015%, Si: 0.01 to 1.0%, Mn: 0.01 to 1.0%, P: 0.01 to 0.03%, S: 0.0005 to 0.010%, N: 0.001 to 0.020%, Cr: 11 to 25%, Mo: 0.01 to 2.0%, one or both of Ti and Nb in 0.05 to 0.5%, and B: 0.0003 to 0.0030% and comprising a balance of Fe and unavoidable impurities, having an elongation of the welded pipe plate in the direction becoming the circumferential direction of 30% or more, and having an average Lankford value (r value) of 1.5 or more.

(4) A method of production of a welded pipe as set forth in any one of (1) to (3), characterized by sizing of 0.5 to 2.0% in circumferential length after forming and welding.

(5) A method of production of a welded pipe as set forth in (4), characterized by annealing at 700 to 850° C. after forming, welding, and sizing.

BRIEF DESCRIPTION OF THE DRAWINGS

FIG. 4 shows the types of cracks in expansion.

FIG. 5 shows the relationship between the state of expansion and the ratio RT $(=T_W/T_M)$ between the bead thickness $T_W$ of the welded pipe and the thickness $T_M$ of the matrix in the case of a hardness difference $\Delta HV$ $(=HV_W-HV_M)$ between the Vicker's hardness $HV_W$ of the weld zone and the Vicker's hardness $HV_M$ of the matrix of 10 to 40 in range.

BEST MODE FOR WORKING THE INVENTION

Figure 1:
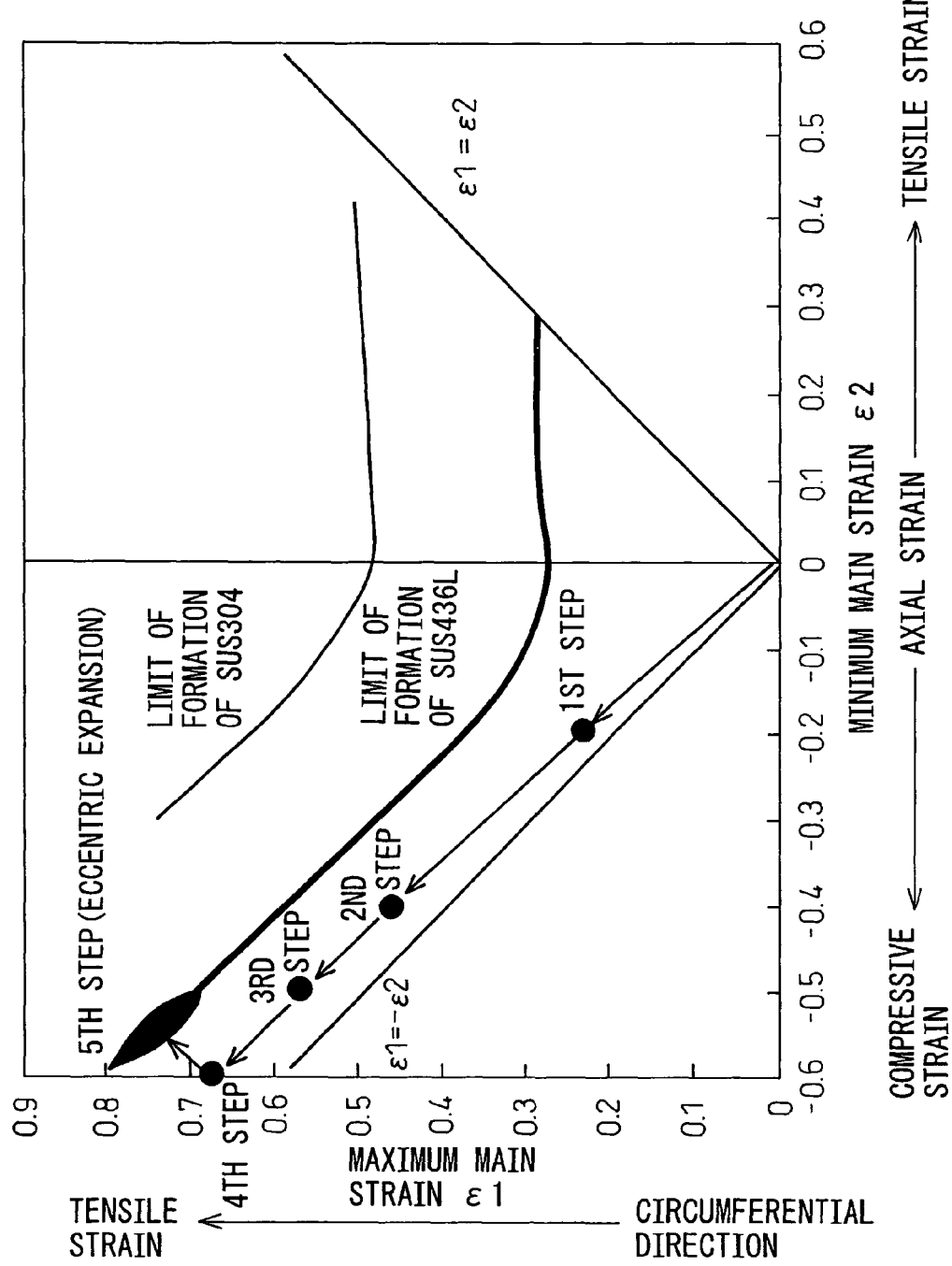
FIG. 1 shows the route of work strain due to eccentric expansion.

Below, the present invention will be explained in detail. Usually, in eccentric expansion by a multi-step process by a punch, as shown in FIG. 1, the welded pipe is compressed and deformed in the pipe axial direction due to the stress in the pipe axial direction caused by the friction with the punch in the different steps. The pipe is expanded while receiving tensile deformation in the circumferential direction. Further, when accompanied with eccentric expansion, the eccentric part bulges out and tensile deformation is locally received in the axial direction and circumferential direction. In particular, the strain in the circumferential direction is large tensile strain, so securing stretching in the circumferential direction has been considered important for eccentric expansion.

Figure 2:
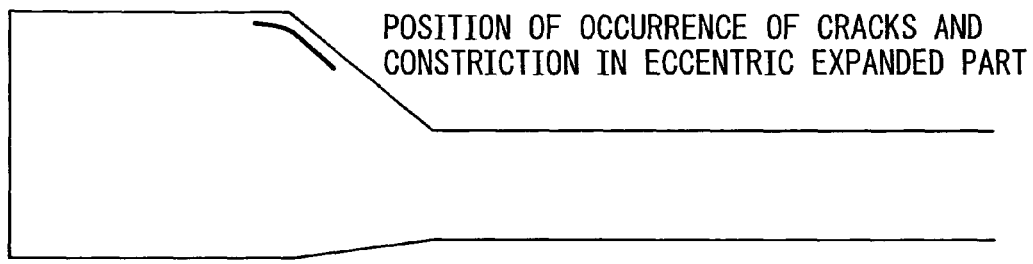
FIG. 2 shows the form of a crack and constriction seen at an eccentrically expanded part.
Figure 3:
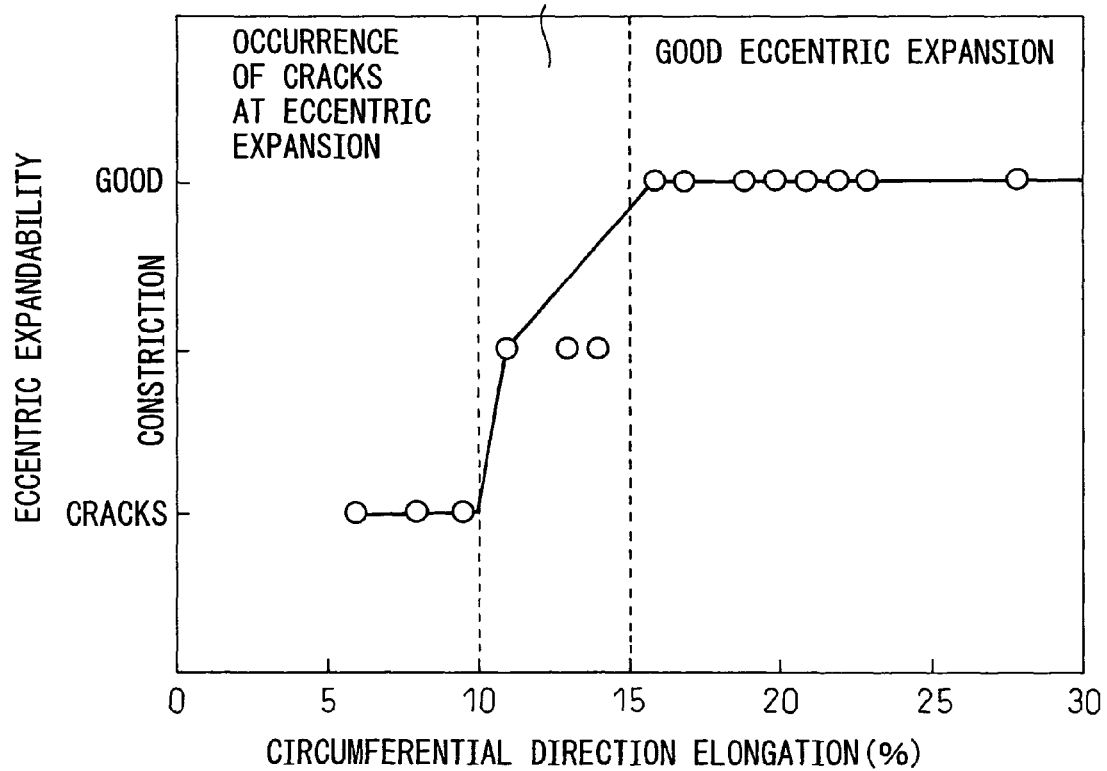
FIG. 3 shows the relationship between the elongation in the circumferential direction and the occurrence of constriction and cracks at eccentric expansion.

In such working, if the matrix of the welded pipe is insufficient in ductility, as shown in FIG. 2, the bulging part of the eccentric expanded part suffers from constriction or cracks in the axial direction. Such constriction or cracks are defects not allowable in fuel feed pipes of automobile fuel system parts—which are important safety parts. The inventors studied the relationship between cracks at the eccentric expanded part and the ductility of the welded pipe matrix and as a result found that the cracks at the eccentric expanded part and elongation in the welded pipe circumferential direction are related, that, as shown in FIG. 3, to suppress constriction and cracks, the elongation in the welded pipe circumferential direction has to be at least 15%, constriction occurs in welded pipe with elongation in the circumferential direction of 15% to 10%, and cracks occur in welded pipe of 10% or less. Note that to secure elongation in the circumferential direction of 15% or more, when roll forming or cage forming to form an open pipe shape, it is necessary as much as possible to use a method of formation by a low strain or means such as using heat treatment to reduce the pipemaking strain and secure ductility. Note that the elongation in the circumferential direction of the matrix of a welded pipe was obtained by cutting and spreading in the circumferential direction, then cutting out a parallel part of a tensile test piece based on JIS13 B, welding gripping parts to the two ends, then conducting a tensile test and measuring the total elongation.

Regarding the original plate of the welded pipe as well, to suppress matrix cracks and suppress the propagation of cracks for both overall strain and local strain, it is preferable to use ferritic stainless steel strip having an elongation in the direction becoming the circumferential direction of 30% or more and an average Lankford value of 1.5 or more. Further, as the original plate of stainless steel used for this, it is preferable to use high purity ferritic stainless steel to which Ti and Nb have been added.

Further, when the balance in strength between the weld zone and the matrix of the welded pipe is not suitable, it leads to cracks. As shown in FIG. 4, when the weld zone is relatively low in strength with respect to the matrix, cracks occur in the weld zone in the axial direction (longitudinal direction).

On the other hand, when the weld zone is too strong with respect to the matrix, the displacement of the weld zone in the pipe axial direction is smaller compared with the matrix, the weld zone sticks out at the ends of the expanded pipe, the difference in displacement between the weld zone and the matrix in the pipe axial direction causes a larger shearing deformation between the two, and cracks occur in the inclined direction from the matrix near the weld zone. Note that the weld zone is assumed to be a weld zone shape free from any locations locally thinner than the matrix due to undercut or poor abutment. If the weld zone shape is defective as above, the weld zone cracks in the axial direction.

In the past, as the method for obtaining a balance in strength of the weld zone and the matrix and improving the workability of the welded pipe, as shown in Japanese Patent Publication (A) No. 7-265941 etc., it had been proposed to adjust the production conditions such that the difference between the matrix hardness and the weld zone hardness became 10 to 80, but the present inventors found that with multi-step expansion, with just adjusting the weld zone strength (hardness), a suitable balance of strength of the weld zone and the matrix cannot be obtained and that, in addition to the weld zone hardness, the weld zone bead thickness must be made a suitable range.

Note that to adjust the matrix and weld zone hardness and weld bead thickness, in the forming, the roll arrangement, the fin pass roll interval, the squeeze roll interval, and other forming conditions or the amount of correction by sizing after welding and the subsequent heat treatment conditions are important.

Below, the composition of the specific ingredients of the welded pipe used in the present invention will be explained.

C, N: If C and N are added in large amounts, the formability and the corrosion resistance are degraded. Further, to immobilize these, the amount of Ti required increases, so the upper limits were made 0.015% for C and 0.020% for N. The lower limits, considering the refining costs, were made 0.001% for both C and N.

Si: Si is an element used as a deoxidizing element, but if over 1.0%, the formability is remarkably lowered, so the upper limit was made 1.0%. When considering the cost of the refining process, since 0.01% is on the level unavoidably included, this was made the lower limit.

Mn: When adding Mn in a large amount, the formability is reduced, so the upper limit was made 1.0%. When considering the cost of the refining process, since 0.01% is on the level unavoidably included, this was made the lower limit.

P: P causes the formability to decline due to solution strengthening, so the upper limit was made 0.03%. The lower limit increases the steelmaking cost due to the selection of materials etc., so the lower limit was made 0.01%.

S: When adding S in a large amount, the inclusions etc. cause the corrosion resistance to deteriorate, so the upper limit was made 0.010%. The lower limit was made 0.0005% in consideration of the steelmaking costs.

Cr: Cr is an element required for securing the corrosion resistance—a basic property of stainless steel. The Cr required in an automobile fuel system part is 11% as a lower limit in the case of coating. Cr reduces the formability, raises the product cost, and degrades the production efficiency, so the upper limit was made 25%.

Mo: Mo is also an element for improving the corrosion resistance of stainless steel. The upper limit, like with Cr, was made 2.0% from the viewpoint of the formability and cost, while the lower limit was made 0.01% as an unavoidable level.

By adding Ti or Nb in an amount of 0.05 wt % or more, preferably 0.1% or more, it bonds with the C and N to reduce the C and N in solution in the steel and has the effects of raising the elongation and r value and improving the workability. Further, by stabilizing C as a carbide of Ti or Nb, the precipitation of Cr carbide at the weld zone heat affected zone is suppressed and the resistance to grain boundary corrosion can be enhanced. On the other hand, excessive addition raises the strength of the steel due to solid solution or precipitation, addition of Ti causes the problem of occurrence of defects due to inclusions, addition of Nb causes the precipitation of Nb-based precipitates at the production process which suppress recrystallization and crystal grain growth and make it impossible to obtain an elongation or r value, so the upper limit was made 0.5%.

B: B is an element improving the secondary workability and suppresses secondary work cracks in various types of work after expansion. To obtain this effect, 0.0003% or more is necessary, so this was made the lower limit. The upper limit was made 0.0030% since B causes deterioration of the elongation of the material, the r value, and other aspects of the formability.

Next, 25.4 mmφ TIG welded pipe and electric resistance welded pipe were produced by roll forming using SUS436L/0.8 mmt, 1.0 mmt steel strip under various pipemaking conditions, sizing conditions, and heat treatment conditions. The welded pipes were expanded by a multi-step punch operation comprised of four steps (30φ, 38φ, 45φ, and 51φ) and were evaluated for expandability by the presence of cracks at all steps. The results of this will be explained.

To find the hardness difference ΔHV of a welded pipe, the Vicker's hardness of the weld zone was measured by a micro-Vicker's hardness meter at a load of 500 g at 0.5 mm or 0.2 mm intervals and the average was obtained. Further, the matrix was measured for Vicker's hardness at 45 degree intervals across the entire circumference except for the weld zone by a load of 500 g and seven points. The average was used for the evaluation.

The ratio of thickness was evaluated using the thickest location of the weld zone as the weld zone thickness and using the average of seven locations of the matrix measured for the Vicker's hardness as the matrix thickness.

If viewing the hardness difference $\Delta HV$ ($=HV_W-HV_M$) between the Vicker's hardness $HV_W$ of the weld zone and the Vicker's hardness $HV_M$ of the matrix by the relationship of the ratio RT ($=T_W/T_M$) between the bead thickness $T_W$ of the weld zone and the thickness $T_M$ of the matrix and the results of evaluation of the expandability, as shown by the black dot marks in FIG. 5, when the hardness difference ΔHV is less than 10 or the hardness difference ΔHV is 10 to 30 and the thickness ratio RT is less than 1.05, in expansion, the weld zone breaks in the axial direction (longitudinal direction).

Next, as shown by the black triangle marks in FIG. 5, if the hardness difference ΔHV is 10 to 30 or the hardness difference ΔHV is larger than 30 and the thickness ratio RT is larger than 1.3, the difference in the pipe axial direction displacement causes a larger shearing strain between the two and cracks occur in the inclined direction from the matrix near the weld zone.

On the other hand, as shown by the white diamond marks in FIG. 5, when the hardness difference ΔHV is 10 to 40 in range and the thickness ratio RT is 1.05 to 1.3 in range, while there is minor cracking, two-fold expansion of the original pipe is possible. To suppress even this minor cracking, as shown by the white square marks in FIG. 5, the hardness difference ΔHV is preferably 10 to 30 in range and the thickness ratio RT is 1.1 to 1.25 in range.

Figure 6:
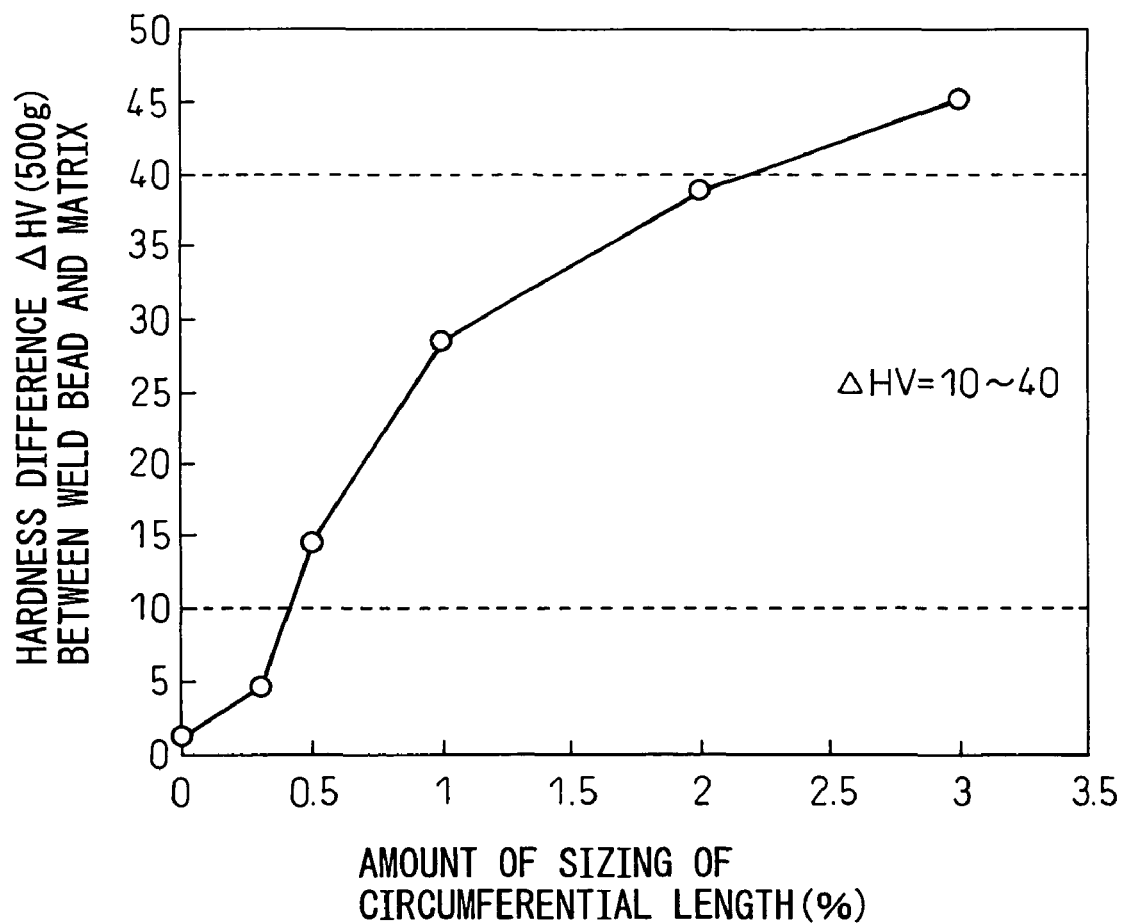
FIG. 6 shows the relationship between the hardness difference $\Delta HV$ between the welded pipe and the matrix and the amount of correction of the circumferential length (SUS436L/TIG welded pipe (25.4 mm$\phi$P0.8 mmt)).

Next, the range of limitation of the amount of sizing of the circumferential length after forming and welding ((circumferential length before sizing-circumferential length after sizing)/circumferential length before sizing)×100(%) will be explained. As shown in FIG. 6, the amount of sizing of the circumferential length is less than 0.5%, the increase in hardness of the weld zone is small, and the weld zone strength required for expansion cannot be obtained. On the other hand, when the amount of sizing of the circumferential length is larger than 2.0%, the weld zone hardness is more than sufficient, but the increase in hardness of the matrix is also great and the deterioration in the workability of the matrix is great. For this reason, the amount of sizing of the circumferential length after shaping and welding has to be 0.5 to 2.0%.

Figure 7:
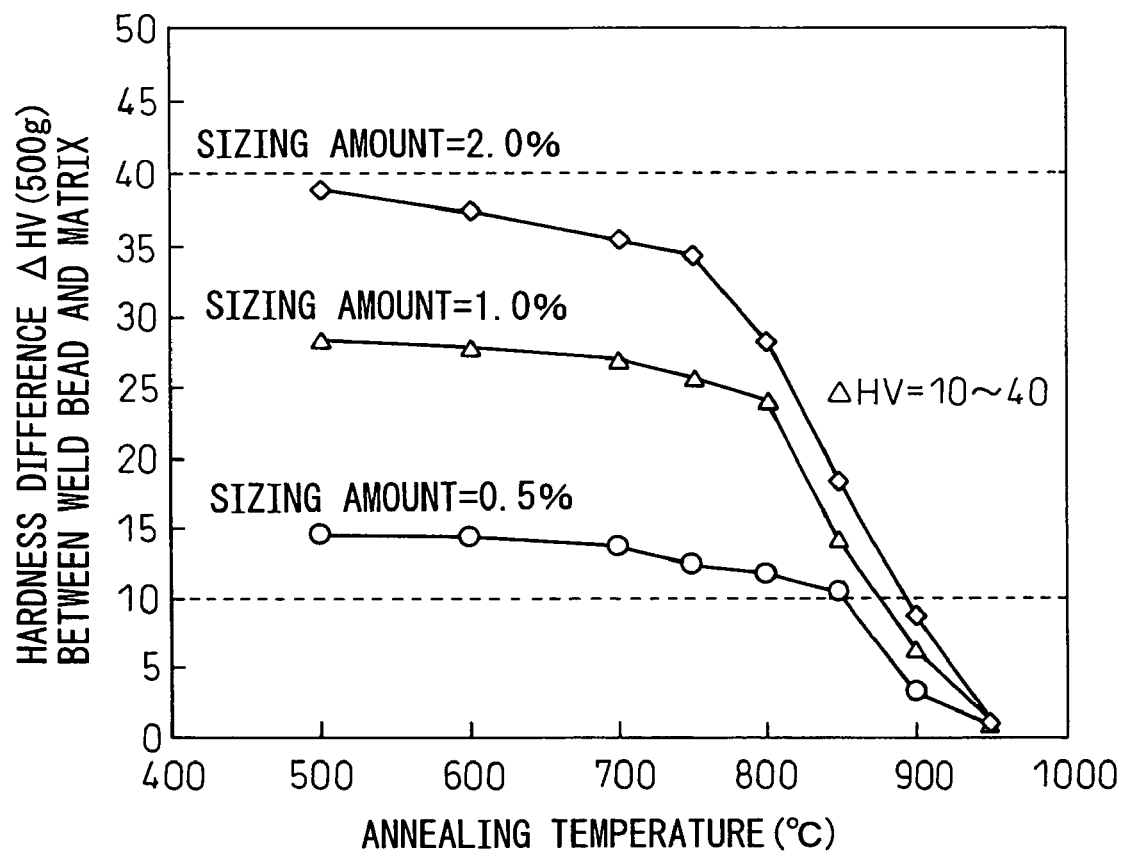
FIG. 7 shows the relationship between the hardness difference $\Delta HV$ between the welded pipe and the matrix and the heat treatment temperature (SUS436L/TIG welded pipe (25.4 mm$\phi$P0.8 mmt)).

Finally, the range of limitation of the temperature of the heat treatment after forming, welding, and sizing will be explained using FIG. 7. The heat treatment is performed to restore the formability of the matrix reduced due to strain caused by shaping, welding, and sizing and to adjust the balance of strength of the weld zone and the matrix. Here, if less than 700° C., the restoration of the formability of the matrix is insufficient and there is no meaning in heat treatment. On the other hand, when higher than 850° C., the weld zone falls in strength (hardness) and becomes the same extent as the matrix, so the balance of the strength of the weld zone and matrix required for expansion cannot be obtained. For this reason, in heat treatment after shaping, welding, and straightening, the heat treatment temperature is preferably 700 to 850° C. in range.

EXAMPLES

Example 1

25.4 mmφTIG welded pipe and electric resistance welded pipe were produced by roll forming using steel plate of the ingredients shown in Table 1 and of 1.0 mm thickness under various forming conditions, amounts of sizing after pipemaking, and heat treatment temperatures as shown in Table 2. The produced welded pipes were expanded by a multi-step punch operation of five steps for eccentric expansion (for 25.4 mmφ welded pipe, 30φ, 38φ, 45φ, 51φ and eccentric expansion of 51φ (13 mm eccentricity)) and were evaluated for expandability by the presence of cracks in all of the steps. Note that with this severe expansion, cracks also occur starting at the weld zone, so the weld bead strength etc. are suitably controlled in production.

TABLE 1

| | Steel type | Ingredients (wt %) | | | | | | | | | | Elongation (%) *1 | Average r value *2 | Remarks |
|---|---|---|---|---|---|---|---|---|---|---|---|---|---|---|
| | | C | Si | Mn | P | S | Cr | Mo | Ti | Nb | N | B | | | |
| Inv. ex. | A | 0.004 | 0.09 | 0.14 | 0.024 | 0.0018 | 17.3 | 1.15 | 0.23 | — | 0.011 | 0.007 | 34 | 1.9 | |
| | B | 0.005 | 0.08 | 0.12 | 0.022 | 0.0025 | 17.4 | 0.51 | 0.22 | — | 0.012 | 0.008 | 35 | 1.7 | |
| | C | 0.008 | 0.47 | 0.35 | 0.018 | 0.0034 | 11.2 | 0.03 | 0.24 | — | 0.013 | 0.011 | 37 | 1.8 | |

TABLE 1-continued

| Steel type | Ingredients (wt %) | | | | | | | | | | | Elongation (%) *1 | Average r value *2 | Remarks |
|---|---|---|---|---|---|---|---|---|---|---|---|---|---|---|
| | C | Si | Mn | P | S | Cr | Mo | Ti | Nb | N | B | | | |
| D | 0.013 | 0.48 | 0.11 | 0.025 | 0.0024 | 19.2 | 0.05 | — | 0.42 | 0.013 | 0.005 | 31 | 1.5 | |
| E | 0.004 | 0.17 | 0.14 | 0.025 | 0.0035 | 19.2 | 1.89 | 0.14 | 0.26 | 0.014 | 0.009 | 32 | 1.8 | |
| F | 0.006 | 0.10 | 0.12 | 0.023 | 0.0025 | 22.3 | 1.62 | 0.18 | 0.30 | 0.011 | 0.005 | 30 | 1.7 | |
| G | 0.009 | 0.96 | 0.95 | 0.02 | 0.0021 | 13.9 | 0.47 | 0.15 | 0.30 | 0.009 | 0.007 | 31 | 1.5 | |
| Comp. ex. H | 0.085 | 0.03 | 0.70 | 0.032 | 0.023 | 16.7 | — | — | — | 0.032 | — | 28 | 1.1 | SUS430 |

—: outside range of the present invention
*1 elongation (%) in direction becoming circumferential direction when forming and welding into welded pipe
*2 when r values in rolling direction, direction perpendicular to rolling, and direction of 45 degrees from rolling are $r_0$, $r_{90}$, and $r_{45}$, average r value = $(r_0 + r_{90} + 2r_{45})/4$.

TABLE 2

| | No. | Type of steel | Method of shaping | Method of welding | Amount Sizing (%) | Heat treatment after pipe-making | Circum-ferential direction elongation (%) | Eccentric expand-ability |
|---|---|---|---|---|---|---|---|---|
| Inv. ex. | 1 | A | Roll forming (low strain) | TIG | 0.5 | None | 28 | G |
| | 2 | A | Roll forming (low strain) | ERW | 1.5 | None | 15 | G |
| | 3 | B | Roll forming (low strain) | TIG | 0.7 | None | 25 | G |
| | 4 | B | Roll forming (low strain) | ERW | 1.0 | None | 21 | G |
| | 5 | C | Roll forming (low strain) | TIG | 0.8 | None | 23 | G |
| | 6 | C | Roll forming (low strain) | ERW | 1.2 | None | 18 | G |
| | 7 | D | Roll forming (low strain) | TIG | 0.7 | None | 22 | G |
| | 8 | D | Roll forming (low strain) | ERW | 0.5 | None | 26 | G |
| | 9 | E | Roll forming (low strain) | TIG | 1.3 | None | 17 | G |
| | 10 | E | Roll forming (low strain) | TIG | 0.7 | None | 24 | G |
| | 11 | F | Roll forming (low strain) | TIG | 0.5 | None | 23 | G |
| | 12 | F | Roll forming (low strain) | TIG | 0.6 | None | 24 | G |
| | 13 | G | Roll forming (low strain) | TIG | 0.8 | None | 21 | G |
| | 14 | G | Roll forming (low strain) | TIG | 0.5 | None | 25 | G |
| | 15 | A | Roll forming | TIG | 1.5 | 800° C. | 23 | G |
| | 16 | B | Roll forming | TIG | 1.8 | 850° C. | 24 | G |
| | 17 | C | Roll forming | TIG | 0.9 | 750° C. | 28 | G |
| | 18 | D | Roll forming | TIG | 1.2 | 800° C. | 22 | G |
| | 19 | E | Roll forming | TIG | 0.5 | 800° C. | 23 | G |
| | 20 | F | Roll forming | TIG | 0.7 | 800° C. | 21 | G |
| | 21 | G | Roll forming | TIG | 0.8 | 800° C. | 23 | G |
| Comp. ex. | 22 | A | Roll forming | ERW | 1.0 | None | 11 | F |
| | 23 | B | Roll forming | ERW | 1.1 | None | 13 | F |
| | 24 | C | Roll forming | TIG | 1.0 | 500° C. | 14 | F |
| | 25 | D | Roll forming | TIG | 0.9 | 600° C. | 9 | P |
| | 26 | E | Roll forming | TIG | 0.8 | None | 8 | P |
| | 27 | F | Roll forming | TIG | 1.2 | None | 6 | P |
| | 28 | G | Roll forming | TIG | 0.9 | None | 11 | F |
| | 29 | H | Roll forming | TIG | 0.5 | 750° C. | 14 | P |
| | 30 | H | Roll forming | TIG | 0.5 | 800° C. | 17 | P (weld zone) |
| | 31 | H | Roll forming (low strain) | TIG | 0.5 | None | 13 | P |

G (good): good formability,
F (fair): constriction occurred,
P (poor): cracks occurred As shown in Table 2, the different types of welded pipes were evaluated for eccentric expandability. As a result, as in Nos. 1 to 14, with high purity ferrite steel having ingredients and material properties in the range of the present invention, by arranging the staggered grooved rolls of Japanese Patent Publication (A) No. 2002-239626 etc. so that the roll intervals become from one to two times the outside diameter of the step rolls, it is possible to reduce the forming strain due to bending and rebending in the roll forming process. Specifically, 10 step rolls of roll outside diameters of 50 mm and roll intervals of 52 mm were arranged staggered in the pipemaking direction. Regarding the sizing after pipemaking with such low strain as well, by making the amount of sizing 1.5% or less in ratio of circumferential length, elongation in the circumferential direction or 15% or more can be secured, no constriction or cracks are seen at the eccentric expanded part, and sufficient eccentric expandability is therefore obtained. Further, as in Nos. 15 to 21, even with pipes obtained by ordinary roll forming, by heat treatment at 700 to 850° C. after pipemaking and sizing, the ductility is restored, the elongation in the circumferential direction becomes 15% or more, no constriction or cracks are seen at the eccentric expanded part, and sufficient expandability is therefore obtained. On the other hand, as in Nos. 22 to 28, in the case of low strain pipes or sizing, no heat treatment, etc. or the case of a low heat treatment temperature, with welded pipe with elongation in the circumferential direction of 15 to 10%, constriction is seen to occur at the eccentric expanded parts, while with materials with elongation in the circumferential direction of 10% or less, cracks occur. It is clear that these cannot be used for the important safety parts of automobiles etc.

On the other hand, if using the steel II (SUS430) of Nos. 29 to 31 as a material, since the material is low in elongation and r value and the properties of the weld zone are inferior, cracks occur in the matrix eccentric expanded part and the weld zone and use as a material for severe eccentric expansion is not possible.

Example 2

Steel plate of the ingredients shown in Table 3 were used to produce 25.4 mmφ or 28.6 mmφ TIG welded pipe and electric resistance welded pipe (ERW) under different forming conditions, amounts of sizing after pipemaking, and heat treatment temperatures. The produced welded pipes were expanded by a multi-step punch operation comprised of four steps (for 25.4 mmφ welded pipe, 30 φ, 38φ, 45φ, and 51+, while for 28.6 mmφ welded pipe, 38φ, 45φ, 51φ, and 58φ). The expandability was evaluated by the presence of cracks in all steps. The results are shown in Table 4.

TABLE 3

| Steel type | C | Si | Mn | Cr | Mo | Ti | Nb | N | Note | |
|---|---|---|---|---|---|---|---|---|---|---|
| A | 0.004 | 0.09 | 0.14 | 17.3 | 1.15 | 0.23 | — | 0.011 | SUS436L | YUS436S |
| B | 0.005 | 0.08 | 0.12 | 17.4 | 0.51 | 0.22 | — | 0.012 | | YUS432 |
| C | 0.008 | 0.47 | 0.35 | 11.2 | — | 0.24 | — | 0.013 | | YUS409D |
| D | 0.013 | 0.48 | 0.11 | 19.2 | — | — | 0.42 | 0.013 | | YUS180 |
| E | 0.004 | 0.17 | 0.14 | 19.2 | 1.89 | 0.14 | 0.26 | 0.014 | | YUS190 |
| F | 0.006 | 0.10 | 0.12 | 22.3 | 1.62 | 0.18 | 0.30 | 0.011 | | YUS220M |
| G | 0.009 | 0.96 | 0.95 | 13.9 | 0.47 | 0.15 | 0.30 | 0.009 | | YUS450MS |
| H | 0.070 | 0.16 | 0.61 | 16.2 | — | — | — | 0.020 | | SUS430 |
| I | 0.016 | 0.45 | 0.12 | 19.3 | — | — | 0.59 | 0.019 | | YUS180M |

TABLE 4

| | No. | Steel | Welding method | Dia. (mm) | Thick. (mm) | Amount of sizing (%) | Heat treatment temperature (°C.) | Hardness difference ΔHV of weld zone and matrix | Thickness ratio of weld bead and matrix $T_W/T_M$ | Expandability |
|---|---|---|---|---|---|---|---|---|---|---|
| Inv. ex. | 1 | A | TIG | 25.4 | 0.8 | 1.5 | 800 | 25 | 1.15 | VG |
| | 2 | A | TIG | 25.4 | 1.0 | 0.8 | — | 20 | 1.10 | VG |
| | 3 | A | ERW | 25.4 | 0.8 | 1.0 | — | 28 | 1.08 | G |
| | 4 | A | ERW | 28.6 | 1.0 | 1.5 | 750 | 32 | 1.08 | G |
| | 5 | B | TIG | 25.4 | 0.8 | 0.5 | 850 | 11 | 1.15 | G |
| | 6 | B | TIG | 25.4 | 1.0 | 1.8 | 800 | 32 | 1.20 | VG |
| | 7 | B | ERW | 28.6 | 1.0 | 0.7 | — | 22 | 1.10 | VG |
| | 8 | C | TIG | 25.4 | 0.8 | 0.5 | 700 | 10 | 1.23 | VG |
| | 9 | C | ERW | 25.4 | 1.0 | 1.5 | — | 32 | 1.18 | G |
| | 10 | C | ERW | 28.6 | 1.0 | 0.7 | — | 20 | 1.10 | VG |
| | 11 | D | TIG | 25.4 | 0.8 | 1.8 | 800 | 30 | 1.15 | VG |
| | 12 | D | ERW | 28.6 | 1.0 | 1.0 | — | 28 | 1.08 | G |
| | 13 | E | TIG | 25.4 | 1.0 | 2.0 | 800 | 33 | 1.20 | G |
| | 14 | E | ERW | 28.6 | 1.0 | 0.7 | 800 | 20 | 1.10 | VG |
| | 15 | F | TIG | 25.4 | 0.8 | 1.0 | — | 25 | 1.11 | VG |
| | 16 | F | ERW | 28.6 | 0.8 | 1.1 | 800 | 20 | 1.10 | VG |
| | 17 | G | TIG | 25.4 | 0.8 | 1.1 | 800 | 20 | 1.12 | VG |
| | 18 | G | ERW | 25.4 | 1.0 | 1.0 | 750 | 23 | 1.08 | G |
| Comp. ex. | 19 | H | TIG | 25.4 | 1.0 | 1.0 | 850 | 45 | 1.20 | VP (2nd step) |
| | 20 | H | ERW | 25.4 | 0.8 | 0.5 | 800 | 50 | 1.15 | VP (3rd step) |
| | 21 | I | TIG | 25.4 | 1.0 | 0.8 | 800 | 25 | 1.21 | VP (3rd step) |
| | 22 | I | ERW | 28.6 | 1.0 | 0.7 | 800 | 25 | 1.18 | VP (4th step) |
| | 23 | A | TIG | 25.4 | 1.0 | 0.2 | — | 3 | 1.05 | P (2nd step) |
| | 24 | B | ERW | 28.6 | 1.0 | 0.3 | 800 | 8 | 1.08 | P (3rd step) |
| | 25 | C | TIG | 25.4 | 0.8 | 0.2 | 800 | 5 | 1.15 | P (2nd step) |
| | 26 | D | TIG | 28.6 | 0.8 | 0.3 | 800 | 5 | 1.20 | P (3rd step) |
| | 27 | E | TIG | 25.4 | 1.0 | 0.4 | 800 | 6 | 1.30 | P (3rd step) |
| | 28 | F | ERW | 28.6 | 1.0 | 0.3 | — | 8 | 1.20 | P (2nd step) |
| | 29 | A | TIG | 25.4 | 1.0 | 1.2 | 900 | 4 | 1.35 | P (3rd step) |
| | 30 | B | TIG | 25.4 | 0.8 | 1.9 | 900 | 4 | 1.42 | P (2nd step) |
| | 31 | C | ERW | 25.4 | 1.0 | 0.9 | 900 | 8 | 1.10 | P (2nd step) |
| | 32 | D | ERW | 28.6 | 1.0 | 0.8 | 950 | 7 | 1.12 | P (3rd step) |
| | 33 | E | ERW | 28.6 | 1.0 | 1.1 | 950 | 5 | 1.10 | P (3rd step) |
| | 34 | F | ERW | 28.6 | 1.0 | 1.8 | 950 | 5 | 1.07 | P (2nd step) |
| | 35 | G | TIG | 28.6 | 1.0 | 1.9 | 900 | 6 | 1.18 | P (3rd step) |
| | 36 | A | TIG | 25.4 | 0.8 | 0.8 | 800 | 20 | 1.04 | P (2nd step) |
| | 37 | B | ERW | 25.4 | 0.8 | 0.7 | 800 | 18 | 1.35 | VP (2nd step) |
| | 38 | C | ERW | 28.6 | 1.0 | 0.8 | 800 | 21 | 1.38 | VP (2nd step) |
| | 39 | D | TIG | 25.4 | 1.0 | 1.0 | 800 | 23 | 1.04 | P (3rd step) |

TABLE 4-continued

| No. | Steel | Welding method | Dia. (mm) | Thick. (mm) | Amount of sizing (%) | Heat treatment temperature (° C.) | Hardness difference ΔHV of weld zone and matrix | Thickness ratio of weld bead and matrix $T_W/T_M$ | Expandability |
|---|---|---|---|---|---|---|---|---|---|
| 40 | E | TIG | 28.6 | 0.8 | 0.6 | 800 | 15 | <u>1.33</u> | VP (3rd step) |
| 41 | F | TIG | 25.4 | 0.8 | 1.2 | 800 | 25 | <u>1.35</u> | VP (2nd step) |
| 42 | G | ERW | 28.6 | 1.0 | 0.7 | 800 | 18 | <u>1.03</u> | P (2nd step) |

G (good): minor cracks (cracks <3 mm),
VG (very good): no cracks,
P (poor): longitudinal cracks at weld zone,
VP (very poor): cracks in inclined direction in matrix near weld zone
Underlines: conditions outside scope of present invention The welded pipes of different types of steel and different production conditions were evaluated for expandability. As a result, in No. 1 to No. 18 with ranges of the present invention of ingredients, hardness differences between the Vicker's hardness of the weld zone and the Vicker's hardness of the matrix, and ratios of thickness of the matrix and weld bead, regardless of the welding method and pipe size, the pipe ends either had no cracks or else minor ones and expansion to two times the diameter of the original pipes was possible without problem.

On the other hand, in No. 19 to No. 22 where the ingredients are outside of the range of the present invention, the weld zone becomes high in hardness or the matrix becomes inferior in workability, so cracks occur in the inclined direction of the matrix from near the weld zone. In No. 23 to No. 35 with a small difference ΔHV of hardness of the weld zone and matrix due to the amount of sizing after pipemaking or the annealing conditions, at the initial processes of the two or three processes of the expansion process, longitudinal cracks occur at the weld zone.

In Nos. 36 to 42 with a thin or thick weld bead, cracks occur in an inclined direction at the matrix near the weld zone. When the weld bead is thin, cracks occur in the longitudinal direction at the weld zone.

INDUSTRIAL APPLICABILITY

As explained above, the present invention can provide ferritic stainless steel pipe able to withstand the severe usage environment of an automobile exhaust system or fuel system parts, superior in expandability, and free of matrix cracks due to eccentric expansion.

The invention claimed is:

1. Ferritic stainless steel welded pipe having one or both of Ti and Nb in an amount of 0.05 to 0.5 wt % and superior in expandability by a multi-step process, said ferritic stainless steel consisting of a matrix and a welded zone, said ferritic stainless steel welded pipe characterized in that after forming, welding, and sizing, the matrix of the welded pipe has an elongation in the circumferential direction of 15% or more, and a hardness difference $\Delta HV$ ($=HV_W-HV_M$) between the Vicker's hardness $HV_W$ of the weld zone and the Vicker's hardness $HV_M$ of the matrix is 10 to 40 in range; and in that a ratio RT ($=T_W/T_M$) between a bead thickness $T_W$ of the weld zone and a thickness $T_M$ of the matrix is 1.05 to 1.3.

2. Ferritic stainless steel welded pipe superior in expandability as set forth in claim 1, characterized by the steel pipe having been fabricated from a steel plate including, by wt %, C: 0.001 to 0.015%, Si: 0.01 to 1.0%, Mn: 0.01 to 1.0%, P: 0.01 to 0.03%, S: 0.0005 to 0.010%, N: 0.001 to 0.020%, Cr: 11 to 25%, Mo: 0.01 to 2.0%, one or both of Ti and Nb in 0.05 to 0.5%, and B: 0.0003 to 0.0030% and a balance being Fe and unavoidable impurities, having an elongation of 30% or more in the direction becoming the circumferential direction, and having an average Lankford value (r value) of 1.5 or more.

3. A method of production of a welded pipe as set forth in claim 1 or 2, comprising the steps of forming, welding and thereafter sizing the circumferential length such that an amount of sizing in circumferential length defined as ((circumferential length before sizing−circumferential length after sizing)/circumferential length before sizing) is 0.5 to 2.0%.

4. A method of production of a welded pipe as set forth in claim 3, further comprising a step of annealing at 700 to 850° C. after forming, welding, and sizing.

* * * * *